United States Patent [19]

Grimmer et al.

[11] Patent Number: 5,400,751

[45] Date of Patent: Mar. 28, 1995

[54] MONOBLOCK INTERNAL COMBUSTION ENGINE WITH AIR COMPRESSOR COMPONENTS

[75] Inventors: John Grimmer, Trafalgar; Glen Juergensen, Greenwood, both of Ind.

[73] Assignee: Hurricane Compressors, Franklin, Ind.

[21] Appl. No.: 145,816

[22] Filed: Nov. 2, 1993

[51] Int. Cl.⁶ .............................................. F02B 75/06
[52] U.S. Cl. ................................. 123/192.2; 417/237; 417/364
[58] Field of Search .............. 123/192.2, 560, DIG. 7; 417/237, 364

[56] References Cited

U.S. PATENT DOCUMENTS 1,690,080  10/1928  Seng et al. ........................ 123/560

Primary Examiner—Noah P. Kamen
Attorney, Agent, or Firm—Woodard, Emhardt, Naughton, Moriarty & McNett

[57] ABSTRACT

Monoblock engine/air compressor combinations, particularly those providing high pressure gas, experience problems in lubricating the piston pins connecting the compressor piston assemblies to the engine connecting rods. To alleviate this problem, additional weight is added to the compressor piston assemblies to force a load reversal at a determinable point in the piston cycle just after top dead center, thereby facilitating lubrication of the piston pins. An equation is disclosed for calculating the weight of the compressor piston as a function of the compressor gas pressure, geometry of the rotating components and engine speed. In another aspect of the invention, weight is added to the engine flywheel to balance an unbalanced compressor piston after the additional weight has been added. In another feature of the invention, a fluid system is provided in a natural gas powered engine in the monoblock combination, which system is designed to purge a volatile residual natural gas/air mixture collecting in the engine crankshaft through piston blow-by. A final feature concerns a supercharger system for providing supercharged air to the engine air intake manifold, which incorporates a plenum surrounding the fan and heat exchanger element of the engine cooling system.

5 Claims, 5 Drawing Sheets

Fig. 5B
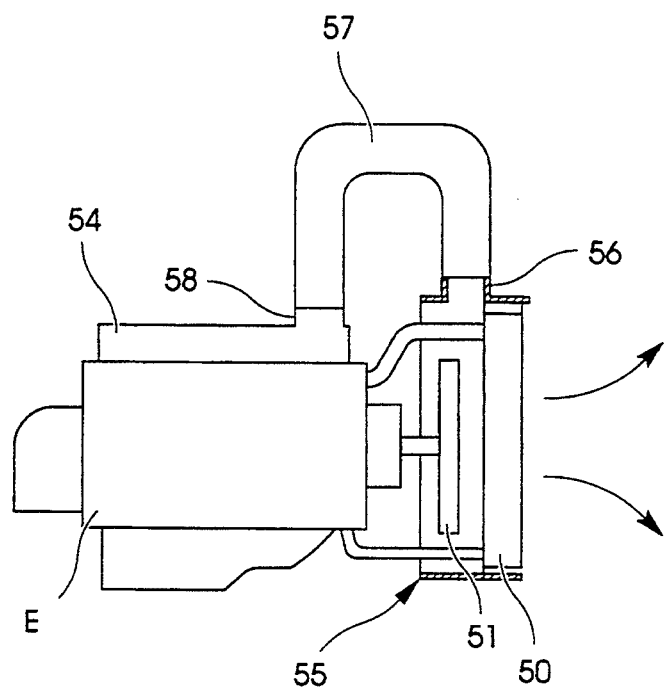
Fig. 5A
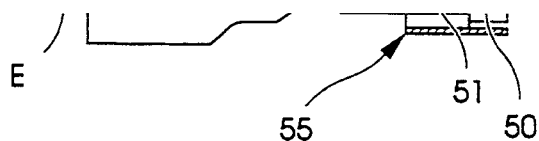
Fig. 5A
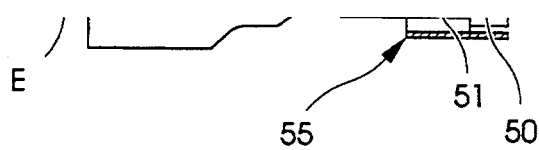
Fig. 5A
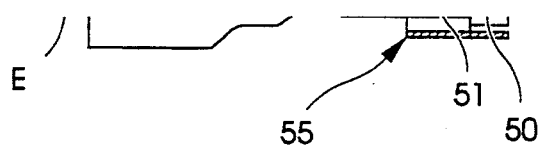
Fig. 5A

MONOBLOCK INTERNAL COMBUSTION ENGINE WITH AIR COMPRESSOR COMPONENTS

BACKGROUND OF THE INVENTION

Systems comprising an internal combustion engine in combination with an air or gas compressor, of the so-called monoblock design, have been in existence for a number of years. The monoblock design utilizes a basic internal combustion engine and converts a number of the cylinders for gas compression. The remaining cylinders drive the device or vehicle. For example, one typical application is for a V-8 engine in which a four of the eight cylinders are configured to engage components of an gas compressor.

In a typical arrangement, the compressor block will be mounted over certain cylinders and the standard engine piston replaced with a specially configured compressor piston. Systems of this type are described in U.S. Pat. Nos. 3,462,074 and 4,232,997. In early monoblock designs, the conversion was limited to single stage compressors operating in the range of 100-125 psi. More recently, higher pressure and multi-stage compressors have been developed using the monoblock concept. These multi-stage or high pressure air compressors have produced new problems due to the high pressure forces involved.

In a typical engine set up, the piston is engaged to the connecting rod by way of a piston pin. The piston pin and connecting rod are configured to allow lubricating oil to enter the loading area between the pin, the piston and the connecting rod. The need for oil at the piston pin and rod assembly is clear—i.e., to prevent premature wear, galling and friction failures. In a typical 4 cycle engine, the load exerted on the piston pin and rod assembly reverses as the piston reaches and passes top dead center and bottom dead center during its cycle. This load reversal is essential in allowing lubricating oil to flow all around the piston pin and rod assembly.

In high pressure or multi-stage compressor systems, the high cylinder pressures at the gas compressor cylinders create high forces that do not permit the load reversals in the piston pin and rod assembly, In other words, the high pressure constantly pushes toward the crankshaft of the engine regardless of whether the piston has passed top dead center in its cycle. With typical piston pin and rod assemblies, the results are friction failures and premature wear and galling of the piston pin assembly.

One way to address this problem is to use frictionless bearings, such as roller and ball bearing assemblies. However, the ball bearing assemblies are generally more expensive and more complicated than the typical piston pin and rod assembly. Perhaps more significantly, the roller and ball bearing assemblies require greater space within the engine for their installation than is required by a piston pin assembly. With a focus on smaller and lighter engines, engine block designers are loathe to increase the otherwise limited space available for these bearing components.

The present invention addresses this problem of the use of high pressure or multi-stage compressors in a monoblock design. In particular, the present invention permits the use of the typical piston pin and rod assembly while allowing for adequate lubrication throughout the entire assembly.

Another aspect of the present invention addresses a means for providing supercharged air to the internal combustion engine component of the monoblock combination. In the past, separate engine driven superchargers have been used to provide higher pressure air to the engine, thereby improving performance and engine efficiency. The separate superchargers add weight and require additional space, an approach often disfavored in the design of engines for use in a monoblock engine/gas compressor combination. Nevertheless, the use of certain engine cylinders for gas compression rather than power frequently necessitates some supercharging capability to maintain performance. One aspect of the present invention provides such supercharging without the penalty of significant additional weight or space requirements.

The present invention further contemplates that the internal combustion engine run on natural gas fuel. Most engines experience some form of blow-by in which the combustion mixture within the cylinders leaks past the pistons into the crankcase. For natural gas engines, collected air/natural gas mixture in the crankcase can be a volatile mixture in the right proportions. There is therefore a need for some safety dictated mechanism for preventing the risk of inadvertent combustion of this air/gas mixture in the engine crankcase. Another aspect of the present invention fulfills this need.

DESCRIPTION OF THE FIGURES

FIG. 5A is a diagramatic representation of an engine in the monoblock configuration of FIGS. 1 and 2 with a plenum supercharger according to one specific embodiment of another aspect of the invention.

FIG. 5B is a diagramatic representation of the plenum supercharger concept of FIG. 5A shown in an alternative configuration.

DESCRIPTION OF THE PREFERRED EMBODIMENTS

Figure 1:
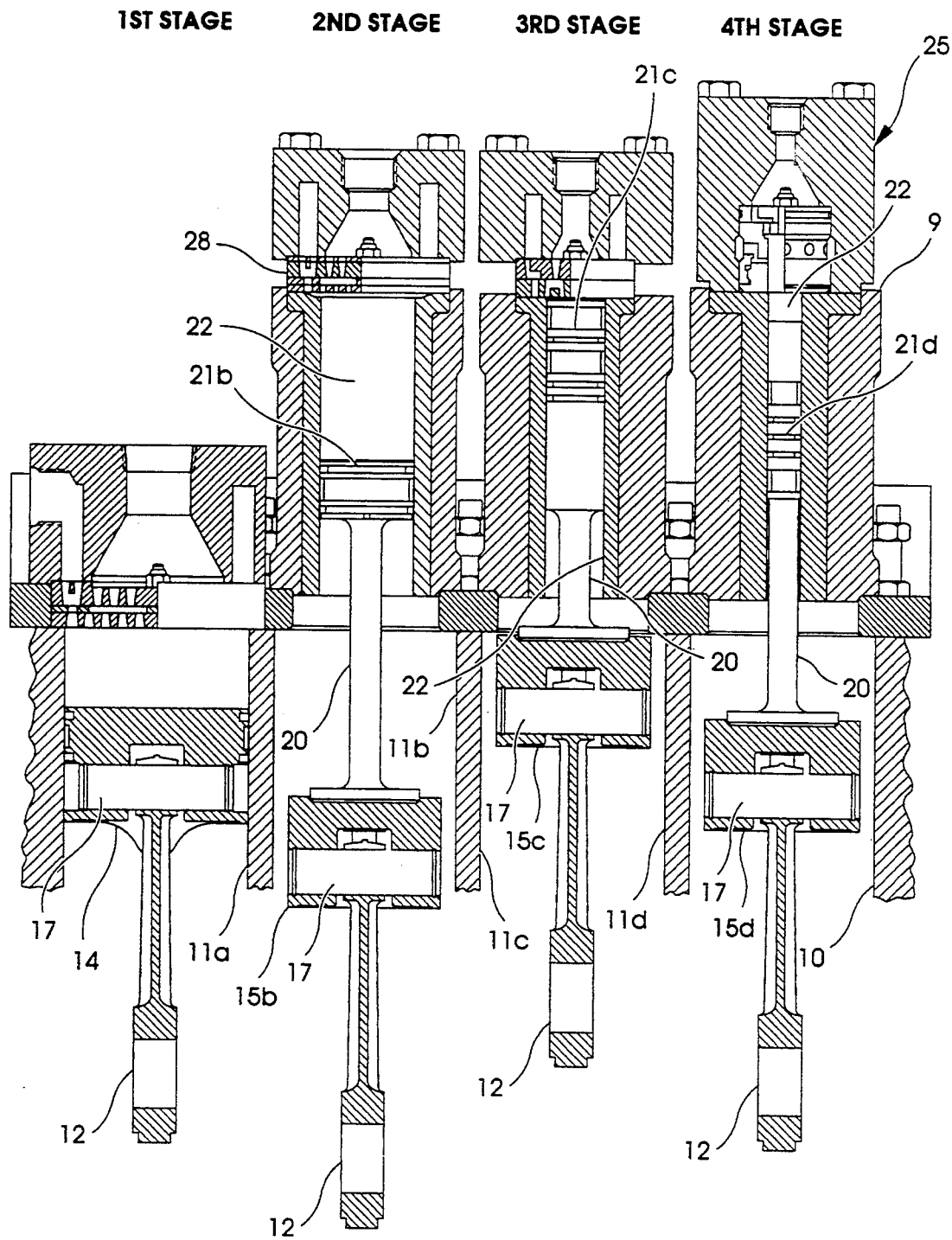
FIG. 1 is a longitudinal cross-sectional view of one portion of a V-8 engine conversion to a monoblock design for use with high pressure compressor components.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In accordance with one aspect of the present invention, a four stage compressor cylinder assembly 9 is mounted to the engine block 10 of a typical V-8 engine. The engine block 10 is of standard design, in the most preferred embodiment a Ford Motor Co. natural gas model LSG-875 engine. The block includes a number of cylinders 11A-11D in one bank of the engine, with the understanding of course that four other companion cylinders are provided in the V-8 configuration. The engine includes connecting rods 12 which are engaged to respective crank arms of the crankshaft (not shown) in a known manner. As shown in FIG. 1, one of the cylinders in the illustrated bank, namely first stage cylinder 11A, is similar to a power cylinder in that no separate compressor piston is provided. In this instance, the connecting rod 12 is engaged to a piston 14 by way of a piston pin 17. The remaining three cylinders in this bank of the V-8 engine are also adapted for mating with the compressor block assembly 10.

Figure 2:
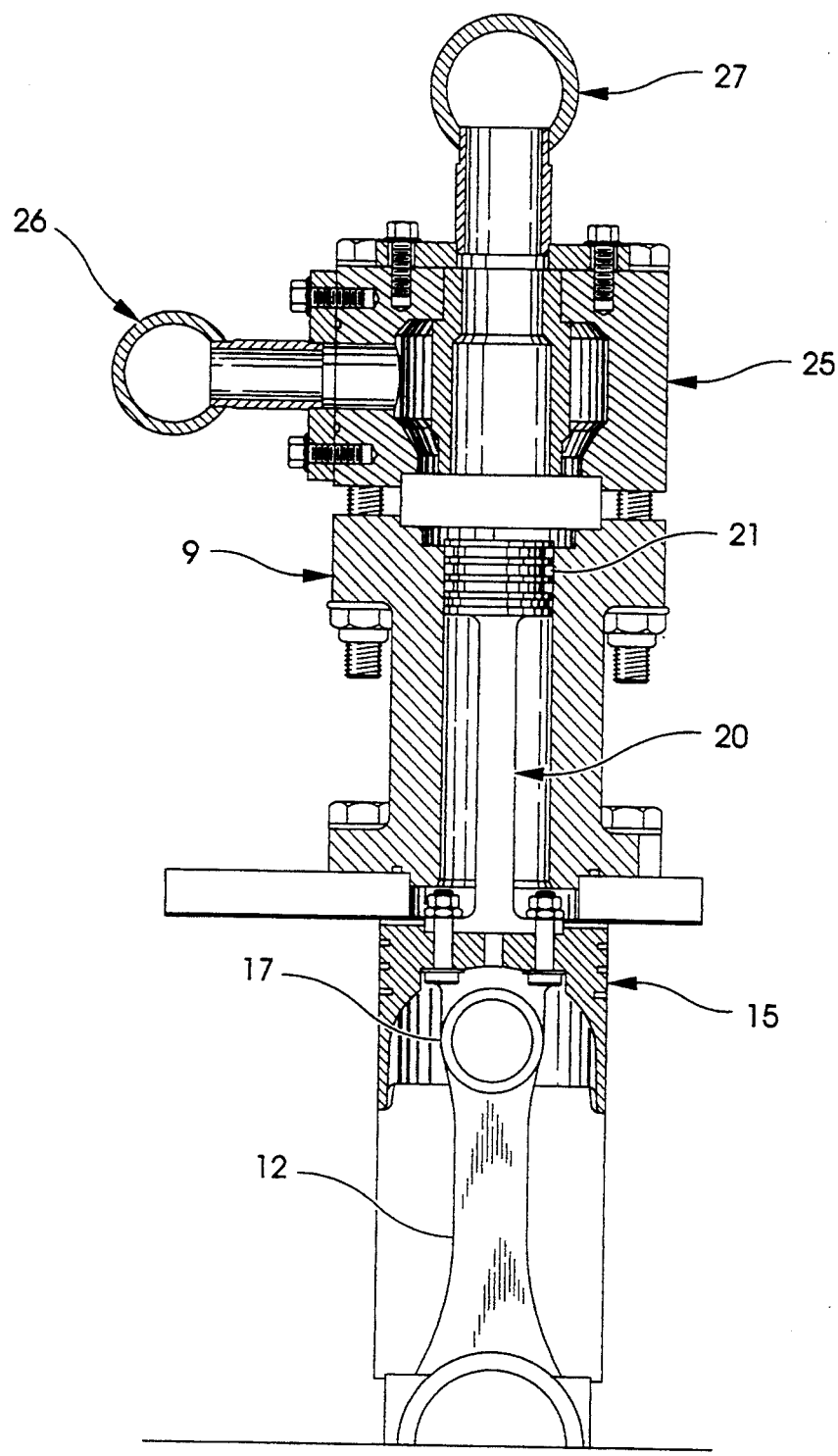
FIG. 2 is an end cross-sectional view of the monoblock design conversion shown in FIG. 1.

Specifically, the connecting rods 12 in the cylinders 11B-11D are engaged to a crosshead compressor piston 15 by way of engine piston pins 17. The crosshead pistons 15 provide a mounting base for supporting a compressor piston 20 which reciprocates within the compressor cylinder 22 forming part of the compressor assembly. Each compressor piston 20 terminates in a corresponding compressor piston head 21 which compresses the gas entering the assembly through manifold assembly 27 (FIG. 2) mounted over the cylinder head 25. The inlet manifold 27 receives gas pressure from each prior stage and an outlet manifold 26 is provided through which the high pressure gas is discharged by the various compressor pistons 20.

It is understood that the connecting rod 12 and engine piston pins 17 are of a known arrangement for V-8 engines. The engagement between the compressor crosshead pistons 15 and compressor piston assemblies is likewise substantially similar to the manner in which the basic engine piston 14 is engaged to the connecting rod 12.

The crux of the present invention concerns a means for, in essence, forcing a load reversal as the piston components pass top dead center. As previously explained, the high pressures present in the compressor cylinder assembly 9 has a tendency to push the compressor piston 20 towards the crankshaft at all points in the piston cycle. The high pressure within the cylinder assembly does not allow load applied to the crosshead piston 15 or piston pin 17 to reverse within the connecting rod support 12. Thus, the load is always in one direction and generally on one side of the piston pin 17, leading to premature failure of the pin. This invention presents the solution by observing the inertia forces of the reciprocating parts attached to the piston pin, and particularly the relationship between the weight of the reciprocating components and the pressure exerted within the compressor cylinder assembly 9. This relationship is explained with reference to the diagram and variables depicted in FIG. 3.

Figure 3:
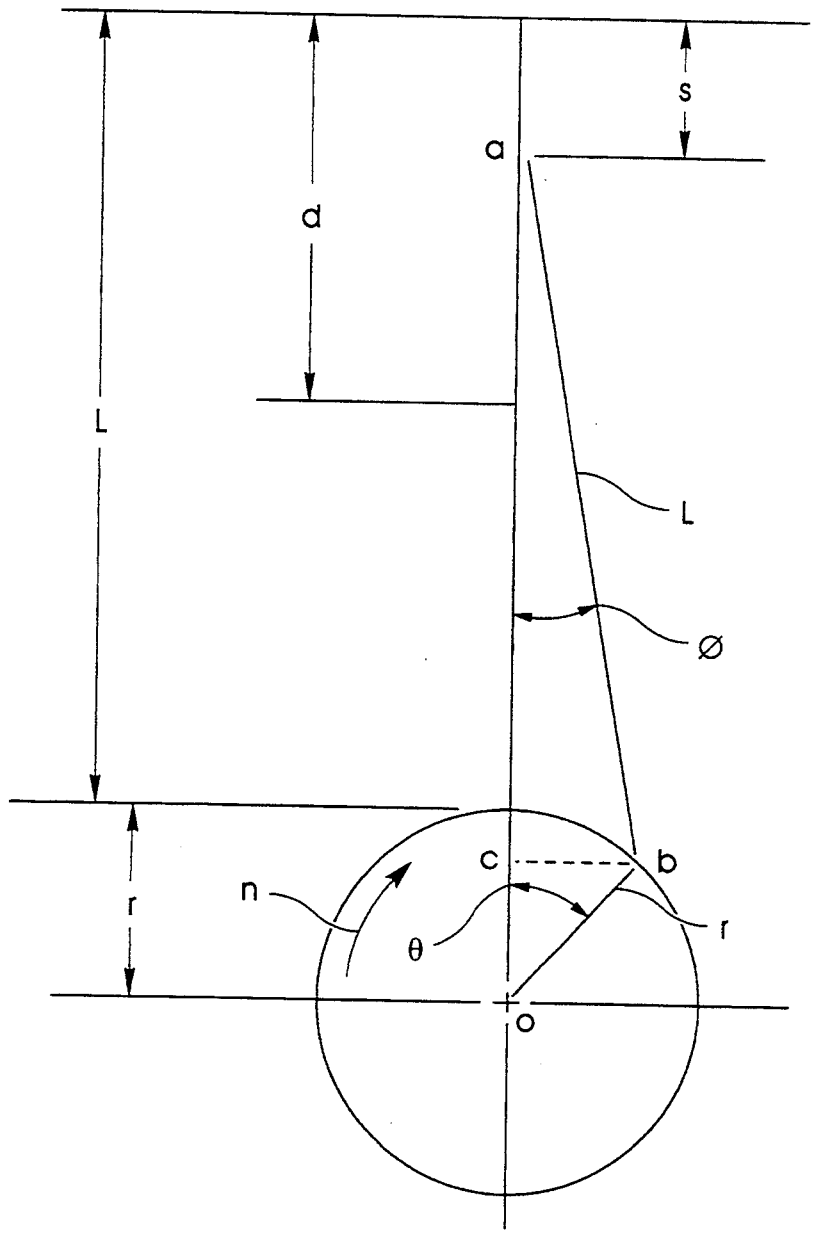
FIG. 3 is a diagramatic view of the geometry of the engine crank arm, connecting rod and piston depicted in FIGS. 1 and 2, to illustrate the point of load reversal accomplished by the present invention.

In FIG. 3, the enumerated variables have the following meanings:

r = radius of the crank arm;
L = length of the connecting rod;
θ = angle of the crank arm at the point of load reversal;
φ = angle of the connecting rod at the point of load reversal;
d = total displacement of the piston between top dead center and bottom dead center;
S = stroke of the piston at the point of load reversal;
o = center line of the crankshaft;
a = geometric location of the top of the piston at the point of load reversal;
b = orientation of the connecting rod-crank connection;
c = geometric projection of the connecting rod-crank connection onto the vertical axis of the cylinder;
n = engine rpm, as represented by the direction of rotation arrow shown in FIG. 3.

It has been found with this invention that forcing a load reversal can be achieved by adjusting the mass of the reciprocating components. In this manner, inertia force generated by the reciprocating components can overcome the force produced by cylinder pressure. This load reversal can be calibrated to occur at the point in the compression cycle where discharge of the compressed gas is complete and suction or introduction of new gas commences, which occurs shortly after the top dead center position of the compressor piston.

The present invention concerns recognition of a novel application of the known equation for centrifugal force, namely:

$$F_{cent} = m * r * \omega^2$$
$$= (2.84*10^{-5}) * n^2 * r \text{ [where the constant ``}m\text{''}$$
is set to convert
mass units into weight and radians/sec.
into rpm ... i.e., $(2*\pi/60)^2 * (1/$
$(386.4 \text{ in./sec}^2))$].

Applying this equation in accordance with the present invention, the mass or weight of the compressor piston assembly 15 and 20 can be derived by assuming that the inertia force of the moving piston must exceed the force exerted by the inlet gas pressure at the compressor cylinder assembly 9. Specifically, this force can be represented by the inlet pressure ($P_I$) multiplied by the area of the compressor piston head 21. The angle through which the inertia force should exceed the gas pressure force is preferably 20-25 crank degrees. It has been further developed that this load reversal does not necessarily occur at top dead center, but rather at some stroke S below top dead center which corresponds to the position of the compressor piston when the inlet gas pressure equals the cylinder pressure.

The value for the stroke S of the piston at the point of load reversal can be obtained from the following equation: $S = TDC - V_I/A$, where A represents the piston area, $V_I$ the total volume needed to equalized inlet and discharge pressure in the clearance area of the cylinder assembly 9, and TDC equals L+r. The volume $V_I$ can be obtained from application of the perfect gas law as follows:

$$V_I = P_D * T_I * V_D P_I * T_D,$$

where the I represents the inlet and D represents the discharge, and where P corresponds to the pressure, T to the temperature and $V_I$ to the clearance volume.

Thus, it can be seen that the stroke at which the load reversal occurs is a direct function of both the inlet gas pressure and the discharge gas pressure in the clearance volume between the top of the pistons 21 a-d and the discharge valve 28 in the compressor cylinder assembly 9.

Once the stroke S has been determined, the angle of the crankarm, angle θ in FIG. 3, as well as the angle of the connecting rod, angle $\phi$, can be determined trigonometrically from the vertex points a, b, c and o. Applicants have discovered the relationship when solving for the minimum weight (W) for the compressor piston assembly 15 to achieve load reversal reduces to the following equation:

$$W = [2.84*10^{-5}*n^2*r*(\cos(\theta)+(r/L)*\cos(2\theta))],$$

where $$\theta = \sin^{-1}(L*\sin(\phi)),$$

and W is greater than $P_I*A$

A specific example can help illustrate the present invention. In this specific example, the variables expressed above have the following values:

| Variable | Value |
|---|---|
| $P_I$ - Inlet pressure | 88.3 PSIG |
| $T_I$ - Inlet temperature | 570° R |
| $P_D$ - Discharge pressure | 272.6 PSIG |
| $T_D$ - Discharge temperature | 714° R |
| $V_D$ - Discharge volume | 1.53 in³ |
| L - Length of connecting rod | 6.605 in. |
| r - Radius of crankarm | 1.925 in. |
| n - Engine rpm | 1800 |
| A - Compressor piston area | 3.976 in² |

Applying the above relationships in accordance with the invention, the stroke at which the load reversal occurs, as given by $V_I/A$, is 0.85 in. With this stroke the angle $\theta$ can be found (after determining the geometric points a, b, c, and o) to be 12.95 degrees. Applying the weight equation, the weight (W) of the compressor piston assembly 15 must be 3.38 lbs. to counteract the inlet pressure force. In this specific example, the standard compressor piston assembly under normal design would weigh 2.9 lbs., but is augmented by 0.48 lbs. to achieve the load reversal feature of the invention. Thus, when the piston has stroked to the position S in which the crankarm is at the angle of $\theta$ of 12.95 degrees, the inertia forces of the rotating now heavier piston are balanced and ultimately exceed the forces generated by the gas pressure through 167.05 (180-12.9) degrees of crank rotation.

The illustrated piston assembly corresponds to the second stage assembly 15b. It is understood that each successive assembly will operate with different inlet and discharge pressures and temperatures, discharge volumes and compressor piston areas, as depicted in FIG. 1. For example, in one monoblock system, the second stage discharge is received by the third stage of 264 PSIG. The third stage discharge from assembly 15c is at 982 PSIG and is fed to the fourth and final stage at 958 PSIG. The final stage discharge can be as high as 5000 PSIG. Each of the stages may require different compressor piston assembly weights in view of these different operating parameters. In Applicants' preferred embodiment, the piston area and discharge volumes are adjusted relative to the inlet gas pressure to each stage so that the weight of compressor piston assembly 15b and 15c is the same.

In accordance with the present invention, each of the compressor pistons assemblies 15 and 20 will be heavier than the engine pistons they replace in order to achieve this thrust reversal by balancing the inertia forces against the compressor gas pressure forces. Under normal operating conditions the engine crankshaft is balanced. It is well known that having an unbalanced reciprocating mass can lead to structural vibration and eccentric revolution of the shaft. Upon application of the present invention, it is certainly recognized that the additional weight of the compressor pistons assemblies 15 and 20 to achieve the load reversal in a high pressure system will also operate to push the rotating masses on the crankshaft out of balance, leading to excessive and sometimes destructive vibration. In a preferred engine, the crank throws for cylinders 11a and 11d are 180° apart, while the crank throws for cylinders 11b and 11c are also 180° apart. With the preferred embodiment of the present invention, the weight of the rotating components in cylinder 11a equals the weight of the power cylinder of the opposite bank of the V engine, and the weight of the compressor piston assemblies 15 b-c are equal. Even though the weight of the rotating components in compressor cylinders 11b and 11c are equal, they are heavier than their counterpart pistons in the power cylinders of the opposite bank. Finally the weight of the reciprocating components in the last cylinder 11d is also greater than its counterpart in the opposite power cylinder.

Although the weight of the rotating components in cylinders 11b and 11c are greater than the weight of the same components in the opposite power cylinders, the fact that the crank throws on these two cylinders are 180° apart means that any inertia forces generated by the two cylinders will be equal and opposite. Consequently these two cylinders do not require any specific balancing in order to avoid vibration problems. However, the last cylinder 11d does not have any counterbalancing component on the crankshaft. In order to counter-balance the unequal mass of the compressor piston assembly 15d and 20 in cylinder 11d, a separate weight is added to the engine flywheel (now shown) which is directly adjacent the cylinder 11d. This additional weight is 180° opposite the position of the crank throw in cylinder 11d so that the resulting load or torque on the crankshaft is completely balanced.

It can certainly be understood that the present invention contemplates adding weight to the engine and monoblock system. However, this weight is less significant than the additional weight that would be required to add roller bearings or other bearing assemblies that do not require load reversals in order to achieve full lubrication. In the specific example provided, the counter-balance weight added to the flywheel is about 1.03 pounds, which is not extremely significant relative to the total weight of the engine. However with the application of the present invention, no re-design of the existing V8 engine is required to provide space for different self lubricating bearing assemblies at the piston pin and connecting rod interface.

In the preferred embodiment of the present invention, the engine comprising the monoblock engine/compressor design operates with natural gas as a fuel. It is well known that natural gas will easily ignite if its mixture with air is about 15 to 18 percent gas. During the operation of the engine, natural gas/air mixture will collect in the crankcase of the engine as the gas escapes past the compression rings (known as blow-by). One risk of natural gas engines is that if enough natural gas escapes into the crankcase to form an explosive mixture, but not enough to suppress the ignition capabilities, a danger exists of spontaneous ignition of the gas mixture.

Figure 4:
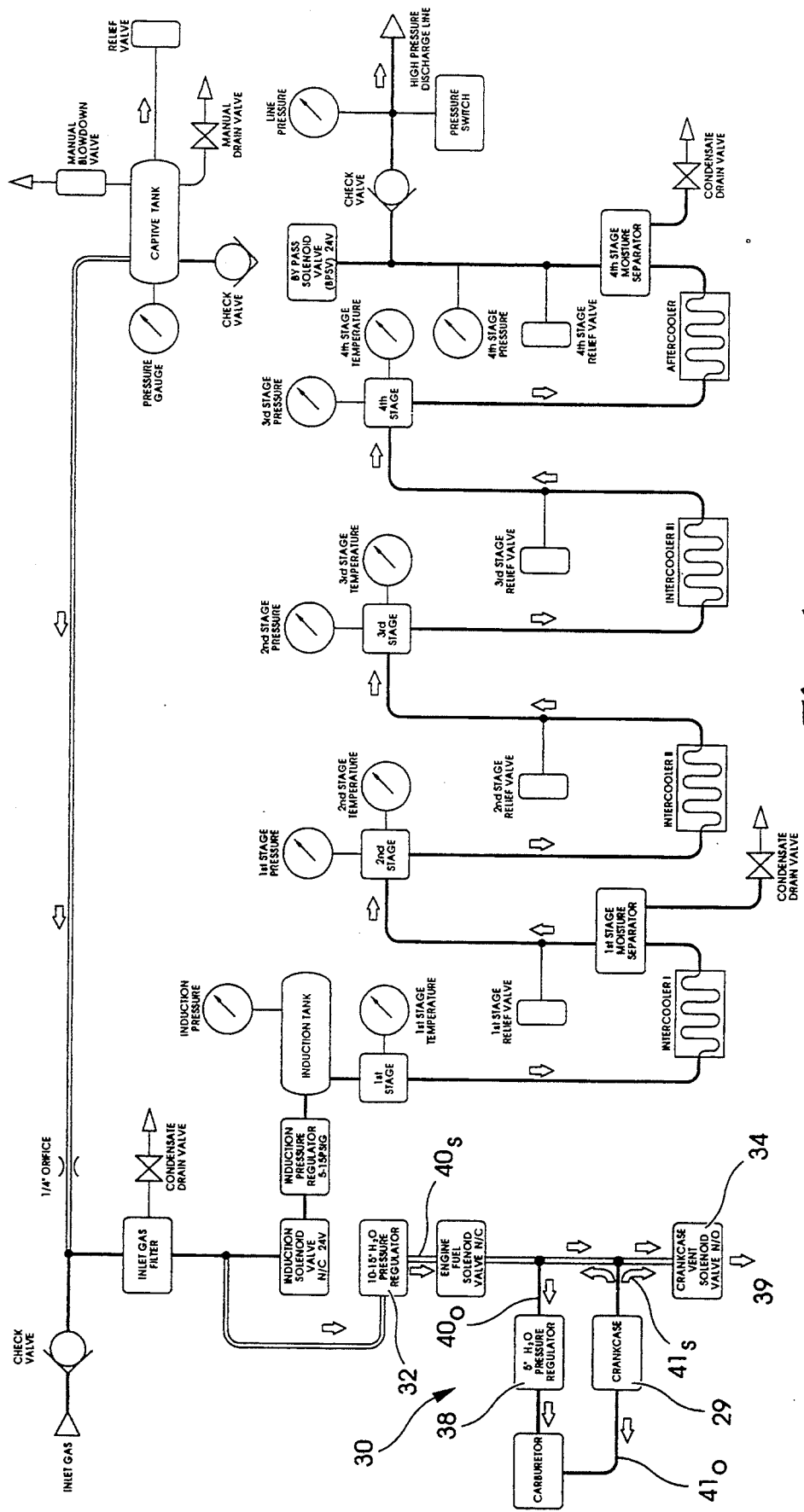
FIG. 4 is a schematic representation of the fluid system for use with the monoblock system of FIGS. 1 and 2, modified to permit crankcase purging in accordance with one aspect of the invention.

In another aspect of the present invention, a fluid system is provided for purging the crankcase of air so that the crankcase is simply a rich mixture of natural gas. In the absence of air no risk of combustion of the natural gas is present. In accordance with the preferred embodiment of the invention illustrated in FIG. 4, an engine natural gas fluid circuit 30 is provided. While the fluid circuit includes various components for providing natural gas to the carburetor, the principal components of the present invention are identified with feature nos. 29–41 on the left side of the figure. The engine crankcase is represented by block 29. The fluid circuit includes a first pressure regulator 32 which in the preferred embodiment regulates the gas pressure at ten inches of water. Natural gas is fed to the carburetor through a carburetor pressure regulator 38, that is set at a lower regulation pressure, such as five inches of water. In this manner, it is certain that gas passing through the first regulator 32 will also pass into the carburetor through the second regulator 38.

In one important aspect of the fluid circuit 30 of the present invention, a crankcase vent solenoid 34 is provided to vent gas to the atmosphere. This solenoid is connected between the pressure regulators 32 and 38, as well as between regulator 32 and the crankcase 29. Flow through the solenoid is represented by the flow arrows 39. In accordance with the preferred embodiment, this crankcase solenoid 34 is energized only at engine start up. At that time, relatively high pressure gas passing through the regulator 32 as shown by flow arrow $40_S$ (where S represents start up), flows into the crankcase 29. The introduction of the natural gas in the crankcase 29 forces air out of the crankcase, as represented by flow arrow $41_S$. Thus, the crankcase is filled with natural gas passing through the first regulator 32, while any air within the crankcase is simultaneously purged along flow line $41_S$.

When the solenoid 34 is closed the crankcase is simply pressurized by the introduction of the natural gas, which would typically occur once the initial purging process is completed after engine start up. During operation, high pressure gas passes through the first solenoid 32, in flow direction $40_O$, and through the carburetor regulator 38 into the carburetor. Likewise, high pressure gas that had previously been forced into the crankcase 29 also vents from the crankcase on flow path $41_O$ into the carburetor. In this manner, the present invention virtually eliminates any risk of spontaneous combustion of the liquid natural gas presented within the crankcase.

Yet another aspect of the present invention contemplates means for providing supercharged air to the engine used with the engine/compressor monoblock combination. As depicted diagramatically in FIGS. 5A and 5B, an engine E includes a cooling unit 50 and 50' respectively, which provides a coolant to the cooling jacket of the engine. Each cooling unit 50 and 50' is typically a heat exchanger which draws heat away from the unit by air flowing across the exchanger components. A fan 51, 51' driven by the engine crank shaft flows air past the cooling unit to affect this heat exchange. In the embodiment of FIG. 5A, the fan 51 is a bladed fan, while the fan 51' of FIG. 5B is a squirrel cage fan.

In the typical case, the air passing from the cooling unit simply exhausts to ambient from the engine housing. In accordance with the present invention, a plenum 55 or 55' is provided which enshrouds the cooling unit 50, 50' and fan 51, 51'. Each plenum 55 and 55' includes an outlet 56, 56' for high pressure air to pass through a pressure hose 57, 57' to the air inlet 58 of an air intake manifold 54 on the engine E. It is known that the air pressure, particularly between the fan 51, 51' and the cooling unit 50, 50' is above atmospheric pressure. Thus, the plenum 55, 55' can be configured to closely surround the cooling unit components with the provision of the outlet 56, 56' at a location to tape into this high pressure air.

It is has been found that the addition of the plenum 55, 55' and high pressure air outlet 56, 56' provides a ready source of supercharged air which when fed to the engine allows for better and more efficient combustion. In addition, the addition of this plenum supercharger helps overcome engine power losses at high altitudes because additional air is being fed to the air intake manifold 54 and engine.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A monoblock engine and gas compressor combination comprising:

an internal combustion engine having;
   a plurality of cylinders;
   a rotating crankshaft; and
   a plurality of connecting rods engaged to said crankshaft, one each reciprocatingly disposed within a corresponding one of said plurality of cylinders,
   wherein at least one of said plurality of cylinders is a power cylinder having a power piston connected to one of said plurality of connecting rods and reciprocatingly disposed within said power cylinder;

a gas compressor having;
   a number of compressor cylinders, each disposed in communication with a corresponding one of said plurality of engine cylinders other than said at least one power cylinder;
   a number of compressor piston assemblies each reciprocatingly disposed within a corresponding one of said number of compressor cylinders; and
   manifold means for introducing a gas into said number of compressor cylinders and for maintaining the gas pressure within said compressor cylinders at above atmospheric pressure;

means for connecting each of said number of compressor piston assemblies to a corresponding one of said plurality of connecting rods, said means including a piston pin rotatably disposed between said connecting rod and said compressor piston;

wherein said power piston has a first weight and and each of said number of compressor piston assemblies has a second weight greater than said first weight; and further wherein said second weight of each of said compressor piston assemblies includes a piston having a piston area A, and its minimum weight exceeds P*A and is determined from the following equation- $$W = (2.84*10^{-5}*n^2*r(\cos(r)+(r/L)*\cos(2r)))$$

where P is the gas pressure into said corresponding one of said number of compressor cylinders, n is the rotational speed of said crankshaft at the gas pressure P (in rpm), r is the radius of a crankarm of said crankshaft, L is the length of said connecting rod, and r is an angle of said crankshaft relative to the top dead center position of said connecting rod.

2. The monoblock engine and gas compressor combination of claim 1, wherein:
said engine is in a V configuration with a first bank of a number of cylinders and an opposite second bank of a second number of cylinders;
all of said second number of cylinders of said second bank are power cylinders; and
all of said number of cylinders in said first bank are in communication with said number of compressor cylinders.

3. The monoblock engine and gas compressor combination of claim 2 wherein said engine is a V-8 engine with four cylinders in each of said first and second banks, with the four cylinders of said second bank being power cylinders, and the four cylinders of said first bank being in communication with four compressor cylinders to form a four stage compressor.

4. The monoblock engine and gas compressor combination of claim 3, wherein:
said compressor pistons of two of said number of compressor cylinders are engaged to said crankshaft to reciprocate at 180° opposite cycles;
the compressor piston of the third of said number of compressor cylinders is engaged to said crankshaft at a crankarm angle; and
said engine includes a flywheel with an added weight equal to the difference between the weight W of the compressor piston assembly and the corresponding power piston in said second bank mounted on said flywheel at an angle 180° opposite said crankarm angle of said third compressor piston.

5. A method for forcing a load reversal in piston pins engaging a compressor piston assembly of a high pressure gas compressor to the connecting rod of an internal combustion engine in a monoblock combination, comprising the steps of:
(a) determining the inlet gas pressure of the high pressure gas compressor;
(b) determining the high pressure gas load on the compressor piston assembly at the inlet gas pressure;
(c) calculating a weight, W, that the compressor piston assembly must equal or exceed P*A in accordance with the following equation- $$W = (2.84*10^{-5}*n^2*r* \cos(r)+(r/L)*\cos(2r)))$$

where P is the inlet gas pressure, A is the piston area, n is the rotational speed of engine crankshaft at the gas pressure P (in rpm), r is the radius of a crankarm of the crankshaft engaged to the compressor piston assembly, L is the length of the connecting rod, and r is an angle of the crankshaft relative to the top dead center position of the compressor piston assembly
(e) adding additional weight to the compressor piston assembly to equal or exceed the calculated W valve.

* * * * *